(12) United States Patent
Cuvelier

(10) Patent No.: US 6,438,996 B1
(45) Date of Patent: Aug. 27, 2002

(54) METHOD FOR CRACKING OFF GLASSWARE

(76) Inventor: Georges Cuvelier, Rue de la Corderie 11, B-7110 Houdeng-Goegnies (BE)

(*) Notice: Subject to any disclaimer, the term of this patent is extended or adjusted under 35 U.S.C. 154(b) by 0 days.

(21) Appl. No.: 09/445,721

(22) PCT Filed: Jun. 10, 1998

(86) PCT No.: PCT/BE98/00085
§ 371 (c)(1),
(2), (4) Date: Dec. 10, 1999

(87) PCT Pub. No.: WO98/56722
PCT Pub. Date: Dec. 17, 1998

(30) Foreign Application Priority Data

Jun. 11, 1997 (BE) .............................. 9700505

(51) Int. Cl.$^7$ .............................. C03B 33/00
(52) U.S. Cl. .............................. 65/105; 65/112; 65/113; 219/121.67; 219/121.71
(58) Field of Search .............................. 65/105, 112, 113, 65/56, 109; 219/121.67, 121.71

(56) References Cited

U.S. PATENT DOCUMENTS 3,935,419 A * 1/1976 Lambert et al. .............. 65/113
4,146,380 A 3/1979 Caffarella et al.
5,902,368 A * 5/1999 Witzmann .................... 65/112

FOREIGN PATENT DOCUMENTS

| | | |
|---|---|---|
| DE | 25 21 612 | 12/1975 |
| DE | 43 05 106 | 8/1994 |
| DE | 43 05 107 | 8/1994 |
| DE | 44 11 037 | 10/1994 |
| DE | 44 34 648 | 4/1996 |
| FR | 2376828 | 8/1978 |
| WO | 92 15534 | 9/1992 |
| WO | WO 94/22778 | * 10/1994 |

* cited by examiner

Primary Examiner—James Derrington
(74) Attorney, Agent, or Firm—Sughrue Mion, PLLC

(57) ABSTRACT

A method for cracking off glassware (1), whereby glass pieces (1) are subjected to a laser radiation treatment (F). In a first step, the part of the glassware to be cracked off (3) is subjected in a region thereof to the action of a continuous laser radiation beam (F) or to continuous laser radiation beams (F) such that the beams touch the part (4) in the region with a power density per unit area less than 30 W/mm$^2$. In a second step, successive points along a line in the part to be cracked off, which has been subjected in the first step to the action of a continuous laser radiation beam (F), are subjected to the action of a focused pulsating laser beam (F) with power less than 250 W, such that, during this second step, the successive points, in the line of the focused laser beam's successive impact points on the part to be cracked off (3), are spaced from each other.

23 Claims, 2 Drawing Sheets

METHOD FOR CRACKING OFF GLASSWARE

BACKGROUND OF THE INVENTION

The subject of the present invention is a method for cracking off glass articles, particularly drinking glasses, vases, etc., that is to say any article of glassware or crystal glassware, by means of a laser ray.

A crack-off method using a laser ray to heat up the region of the glass to be cracked off, possibly followed by mechanical contact with a cold piece in order to create a crack, is known.

This crack-off method allows thin cylindrical glass articles to be cracked off. This method is not suitable for cracking off reentrant, flared, thick or lead-rich glass articles in the light of the number of incorrectly cracked-off, cracked or broken glasses.

The crack-off operation is an important operation in glass making and in crystal glass making since correct crack-off allows the time necessary for flatting the glass to be reduced to a minimum or even, in some cases, avoids having to do any flatting. The flatting operation is described in document BE 670,504.

SUMMARY OF THE INVENTION

The subject of the present invention is a method for cracking off glassware, making it possible to correctly crack off flared glass articles, reentrant glass articles, glass articles having thicknesses ranging from 2 to 5 mm, or even higher, and articles made of lead-rich glass. For certain glass articles, particularly for articles of simple shape (for example cylindrical or approximately cylindrical shape) and for glass articles having a thickness of less than 2 mm, the method according to the invention makes it possible to obtain a cracked-off rim capable of being treated directly in a fire-finishing station, that is to say a rim not having to be flatted.

It should also be pointed out that, for articles that have to undergo a flatting operation, the method according to the invention allows easier and more rapid flatting.

DE-4,411,037 describes a method for cracking off glass hollowware, comprising a phase during which a continuous region comprising the desired line of cutting is heated by means of at least one continuous beam of laser rays and one phase during which this region thus heated is cooled. Before or after the heating phase, a short initiating notch is formed, on the desired line of cutting, either by means of a punch or by means of a focused beam of laser rays.

The method according to the invention is a crack-off method for glassware, in which the articles of glassware rotating about an axis are subjected to a treatment by means of a laser ray. It is characterized in that, in a first step, a rotating article to be cracked off is subjected to a continuous beam of laser rays or to continuous beams of laser rays, so as to define, on the article to be cracked off, a continuous region touched by the said continuous laser beam or beams, and so that the said beam or beams touch one or more parts of the said region with a power density per unit area of less than 30 W/mm$^2$, advantageously less than 25 W/mm$^2$, particularly from 5 to 20 W/mm$^2$, and in that, in a second step, during substantially one rotation of the article to be cracked off or during at least one rotation of the article to be cracked off, the region that was subjected in the first step to the action of one or more continuous beams of laser rays is subjected to the action of a focused pulsed laser beam having a power of less than 250 W so as to form a series of successive points separated from each other, the said series defining an approximately continuous line in the said part, the crack-off taking place substantially along the said line.

The term "focused pulsed laser" should be understood to mean a laser intermittently emitting a laser beam or a laser ray or emitting a laser beam or a laser ray whose power varies over time between a low power, for example a minimum (particularly zero) power and a high power, for example a maximum power, in order to form, on the rotating glass article, a series of points of impact by means of the high-power beam or ray, two successive points of impact being separated from each other. The expression "high power of the beam or ray" means a power sufficient to form microperforation in the glass, the said microperforation having a depth of between 10 and 100 $\mu$m, preferably between 15 and 60 $\mu$m, particularly between 20 and 50 $\mu$m, while "low power of the laser beam or ray" means a power at most sufficient to heat the glass without, or substantially without, perforating the glass (perforation of the glass to a depth of less than 10 $\mu$m, preferably less than 2 $\mu$m, particularly less than 1 $\mu$m).

Advantageously, the focused pulsed laser forms, on the surface (preferably the external surface) of the glass, a series of impacts, defects or microperforations which are separated from each other, the said impacts, defects or microperforations having a depth in the glass of between 15 and 60 $\mu$m, the distance separating two successive impacts, defects or perforations being advantageously greater than the depth of an impact, defect or perforation, but is preferably between 3 and 20 times the depth, particularly 4 to 10 times the depth of the defect, impact or microperforation.

Preferably, in the first step, during at least 3 rotations, preferably at least 5 rotations, particularly more than 10 rotations of the article to be cracked off, the region is subjected to the action of a continuous beam of laser rays or to continuous beams of laser rays so that the said beams touch the said region at one or more of the parts with a power density per unit area of less than 25 W/mm$^2$, particularly between 5 W/mm$^2$ and 20 W/mm$^2$.

Advantageously, the pulsation of the laser beam or beams in the second step and/or the speed of rotation of the article to be cracked off are controlled so that two successive points of impact of the pulsed laser beam are separated from each other by a distance of less than 2 mm, preferably less than 1 mm, particularly by a distance of between 10 $\mu$m and 1 mm, and more specifically by a distance of between 100 $\mu$m and 800 $\mu$m.

Advantageously, the pulsation of the laser beam is controlled so that the pulse frequency is between 500 and 1500 Hz, particularly between 800 and 1200 Hz.

According to one method of implementation, a region of from 2 to 8 mm in width is subjected, in the first step, to the action of one or more laser beams.

According to one advantageous method of implementation, between the first step and the second step, the region is not subjected to the action of a laser beam during a specific time period corresponding to at least 5% of the time period during which the region is subjected to the action of a laser beam or beams in the first step.

According to a preferred method of implementing the first step, the region is subjected to the action of one or more laser beams during at least a first and a second time period, these being separate from each other, while the region is not subjected to the action of a laser beam during an intermediate time period between the periods of treatment by means of one or more laser beams. Advantageously, the intermediate period corresponds to at least 5% of the first time period during which the region is subjected to the action of one or more laser beams in the first step.

According to one possible method of implementation, in the second step, separate parts of the region are simultaneously subjected to the action of a continuous beam of laser rays or continuous beams of laser rays and to the action of a focused pulsed laser beam respectively, so that each part of the region is touched by the continuous beam of laser rays or the continuous beams of laser rays before being touched by the focused pulsed laser beam. Advantageously, in the second step, separate parts of the region are simultaneously subjected to the action of a continuous beam of laser rays or continuous beams of laser rays and to the action of a focused pulsed laser beam respectively, so that each part of the region is touched by the continuous beam of laser rays or the continuous beams of laser rays for at least 0.05 seconds and preferably at least 0.1 seconds before being touched by the focused pulsed laser beam. Advantageously, each part of the region is touched by the continuous beam of laser rays or the continuous beams of laser rays, for no more than 1 second, preferably no more than 0.5 seconds, before being touched by the focused pulsed laser beam. In other words, the time period between the moment of impact of the continuous laser beam on a part of the region and the moment of impact of the pulsed laser beam on the said part of the region is preferably between 0.1 and 0.5 seconds.

In the method according to the invention, the focused pulsed beam of laser rays touches the region at points with a power density of more than 500 W, preferably more than 800 W, per point of impact. The power of the pulsed laser necessary for the method will depend on the thickness of the glass.

In the method according to the invention, the region is advantageously subjected to the action of a focused pulsed beam of laser rays and in that the pulse frequency of the laser beam is adjusted so as to form a series of points of impact in the region which is less than 500 $\mu$m, advantageously less than 250 $\mu$m, preferably less than 100 $\mu$m, preferably less than 50 $\mu$m, in diameter.

Advantageously, in the first step, a collimated laser beam is used, the power of which is, for example, less than 300 W.

The subject of the invention is also a continuous glassware crack-off plant for implementing the method according to the invention, the said plant comprising:

- a device comprising a laser for carrying out the crack-off of a glass article forming a cracked-off rim for the article;
- a device comprising a step-by-step drive system for bringing the glass articles successively towards the crack-off device; and
- a drive system for rotating the glass articles about an axis at least during their crack-off operation. The plant according to the invention is characterized in that it includes two lasers, a first emitting a continuous beam of laser rays, while the second is a pulsed laser emitting a focused pulsed laser beam.

Advantageously, it includes at least one splitter for splitting the continuous beam of laser rays emanating from the first laser into at least a first and a second beam which are separate from each other and means for directing the said first and second separate beams respectively towards a first and second treatment region, so that an article to be cracked off is treated by the first beam in the first region, before being transferred by the step-by-step drive system to the second region where the article treated by the first beam is treated by the second beam. The splitter also makes it possible to be able to use a laser for the parallel treatment of several glass articles.

According to another embodiment, it includes at least one splitter for splitting the continuous beam of laser rays emanating from the first laser into at least a first and a second beam, which are separate from each other, and means for directing the said first and second separate beams respectively towards a first and second treatment region, so that an article to be cracked off is treated by the first beam in the first region, before being transferred by the step-by-step drive system to the second region where the article treated by the first beam is treated by the second beam before being treated by the focused pulsed beam of laser rays.

Preferably, the plant according to the invention includes means for adjusting the power of the pulsed laser, the pulse frequency of the pulsed laser ray and the speed of rotation of the glass articles to be cracked off.

In possible embodiments, the plant may include a cooling station and/or a station for flatting the cracked-off rim of the glass article and/or a station for fire-finishing the cracked-off rim of the glass article.

Finally, the subject of the invention is also a glass article having a cracked-off rim, the said rim being adjacent to a line consisting of points of impact of a laser ray which are separated from each other or correspond, at least partially, to a line consisting of points of impact of a laser ray which are separated from each other, the said points of impact having a diameter of less than 500 $\mu$m, preferably less than 250 $\mu$m, particularly less than 100 $\mu$m, and more particularly less than 50 $\mu$m, and being separated successively from each other by a distance of less than 2 mm, preferably less than 1 mm, particularly between 100 $\mu$m and 800 $\mu$m. Such an article may be easily flatted and may simply undergo fire-finishing without a prior flatting operation.

BRIEF DESCRIPTION OF THE DRAWINGS

Examples of ways of implementing the crack-off method are described below, with reference to the drawings appended hereto. In these drawings.

DETAILED DESCRIPTION OF THE INVENTION

EXAMPLE 1 (Comparative)

Glasses with a cylindrical base, having a flared rim, a diameter of approximately 7 cm and a thickness of approximately 2 mm near the rim to be cracked off, were treated.

The glasses to be cracked off were rotated at a speed of between 142 and 320 revolutions/minute.

The rotating glasses were treated in a first step by means of a laser beam emanating from a collimator, the diameter of the beam being between 4 and 5.5 mm, while the power of the beam was 170 W. During this step, the rim to be cracked off was heated. This laser-heating operation was performed in five seconds.

After this laser-heating step, the glasses were continuously irradiated with a focused laser ray having a power of 170 W.

The crack-off results obtained in this example are random and depend on the quality of the glass.

EXAMPLE 2 (Invention)

Example 1 was repeated, except that:

the first heating step was carried out in two periods of 2.5 seconds, separated from each other by a pause of 0.8 seconds during which the glass is not subjected to the action of a laser ray;

the glasses heated in the first step were subjected to the action of a pulsed focused laser ray, the pulse frequency being 999 Hz; and between the first step of heating the glass and the step of treating with a pulsed focused laser ray, the glasses are not subjected to the action of a laser ray for 0.8 seconds.

The glass crack-off results obtained by this method are excellent, this being so for speeds of rotation of the glasses of 142 revolutions/minute, 200 revolutions/minute and 320 revolutions/minute. In the step of irradiating the glasses by means of the pulsed laser ray, a series of defects (points of impact of the laser ray on the glass) are created to a depth of ±60 $\mu$m and less than 100 $\mu$m in diameter, the said defects being separated from each other by a distance of between 500 $\mu$m and 1 mm, this distance depending on the speed of rotation of the glasses for a defined pulse frequency of the laser.

By virtue of the tension region created during the first heating step, one or more defects are transformed into a fracture which then propagates from defect to defect, or in the vicinity of the defects, but always in this case in the part to be cracked off or the part opposite that having a bottom.

Figure 3:
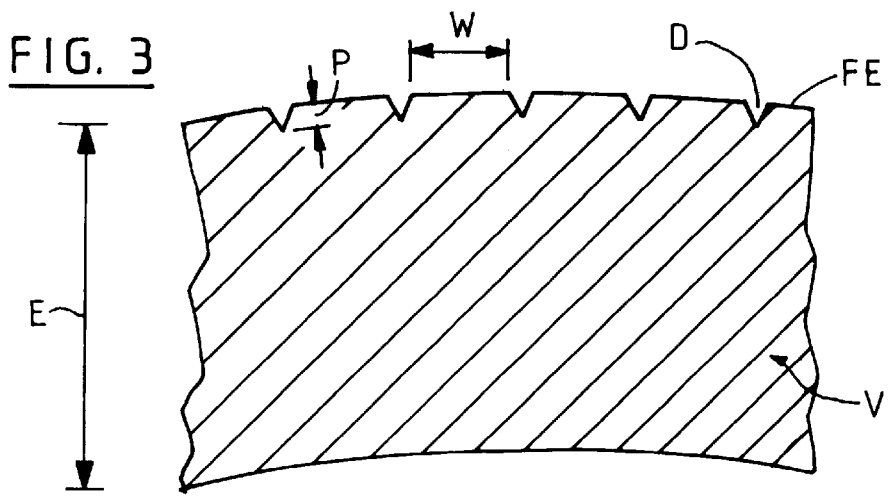
FIG. 3 is a view on a larger scale and in cross section, showing the action of the focused pulsed laser on the glass article.

FIG. 3 shows on a larger scale the series of impacts or microperforations D on the external surface FE, the depth of the defects or microperforations corresponding only to a fraction of the thickness E of the glass.

The distance W between two successive impacts or microperforations is equal to approximately five times the depth of a microperforation.

Figure 4:
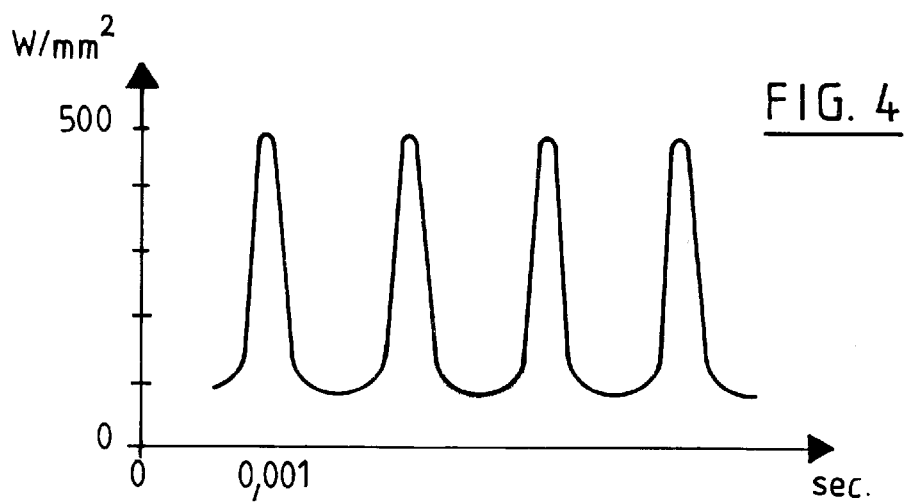
FIGS. 4 and 5 are graphs showing the variable power density of a laser ray or a laser beam over time for two different focused pulsed lasers.
Figure 5:
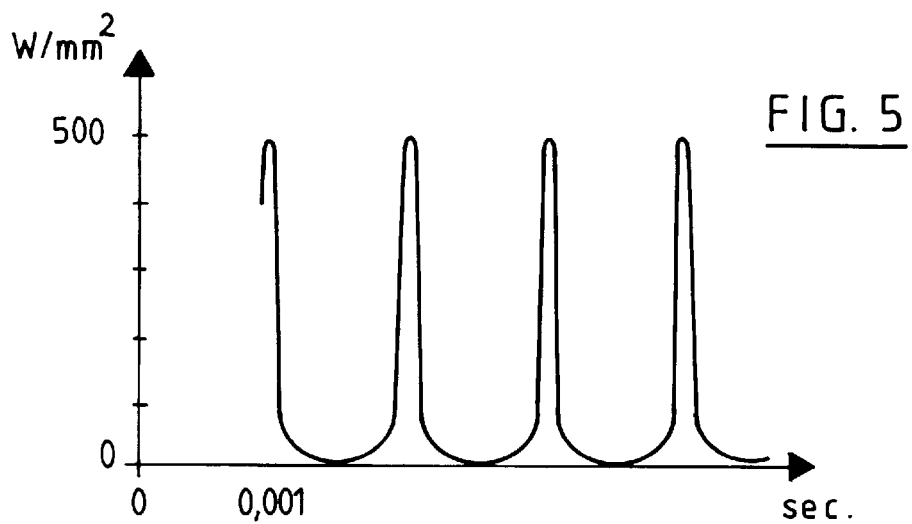

FIGS. 4 and 5 show, as a function of time, the variation in power density (W/mm$^2$) of a beam or ray emitted by two different pulsed and focused lasers.

EXAMPLE 3 (Invention)

The method of Example 2 was repeated, except that the speed of rotation of the glasses was 256 revolutions/minute and that reentrant glasses (of the brandy type) were treated.

The crack-off results are excellent from a quality and quantity standpoint (no losses out of a test of 34 glasses).

Figure 1:
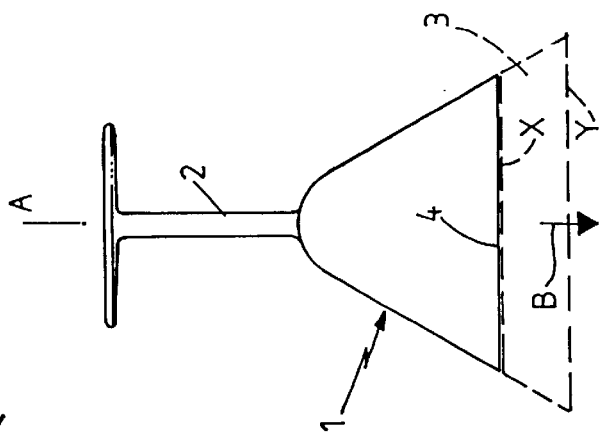
FIG. 1 shows diagrammatically a glass to be cracked off.

FIG. 1 shows diagrammatically a cracked-off glass obtained in this example. The flared glass 1 is supported by its foot 2 (the glass facing downwards) during the treatment. During crack-off, the part 3 facing downwards B is detached from the glass. This part 3 extends between two open ends X, Y. During crack-off, the glass and the part 3 are rotated about their axis of symmetry A. The rim 4 of the cracked-off glass 1 corresponds substantially to the line of points of impact of the pulsed laser ray. The asperities that this rim has are of small height so that slight flatting is necessary to obtain a glass with a perfect upper rim. During flatting of the glass, it was noticed that the flatting was easier.

EXAMPLE 4 (Invention)

Stemmed glasses, the circular upper rim of which has a thickness of 2.5 mm and a diameter of 90 mm, were treated.

The treatment of the glasses was as follows:

speed of rotation of the glasses of 192 revolutions/minute;

first treatment of the rim by means of a collimated laser beam, having a diameter of 5 mm and a power of 170 W, for 3.8 s;

pause for 0.8 s;

second treatment of the rim by means of a collimated laser beam, having a diameter of 5 mm and a power of 170 W, for 3.8 s;

pause for 0.8 s;

treatment of the rim by means of a focused and pulsed laser beam having a power of 170 W and a pulse frequency of 999 Hz.

All the treated glasses were correctly cracked off.

Figure 2:
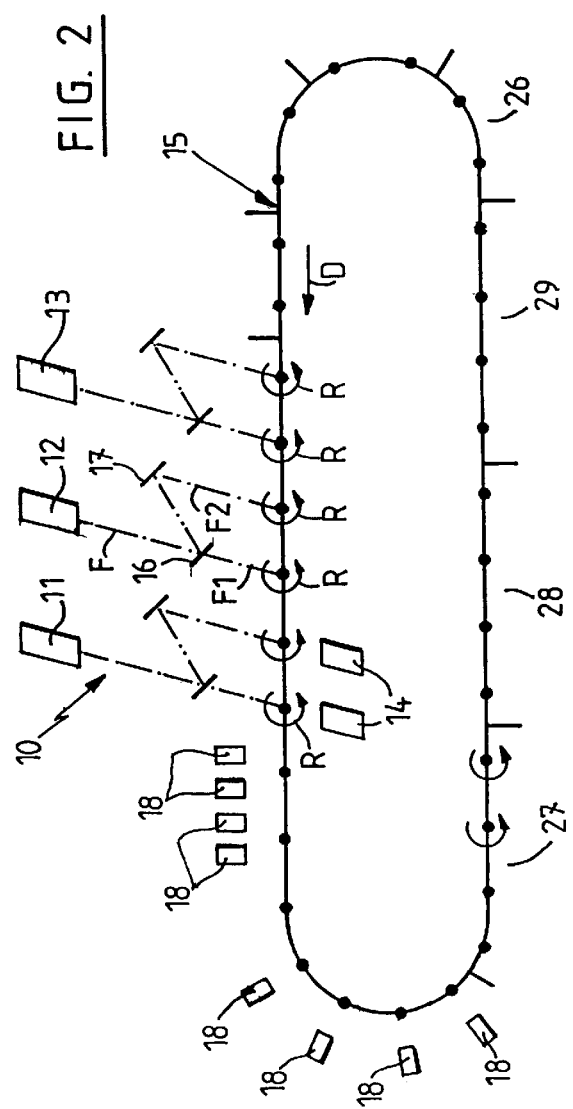
FIG. 2 is a diagrammatic view of a plant according to the invention.

A plant for implementing the method of Examples 2 and 3 is described in FIG. 2 attached hereto.

This plant comprises:

a device 10 comprising lasers 11, 12, 13, 14 for carrying out the operation of cracking off a glass article forming a cracked-off rim for the article;

a conveyor belt 15 comprising a double-indexing step-by-step drive system for taking (arrow D) the glass articles successively to the crack-off device 10, the said belt 15 supporting the glasses by their feet; and a system (not shown) for rotating (arrow R) the glass articles about an axis at least during their crack-off operation. The plant according to the invention comprises several lasers, lasers 11, 12, 13 producing a continuous beam of laser rays, while the lasers 14 produce a focused pulsed laser beam.

The lasers 11, 12, 13 are each associated with a splitter 16 for splitting the beam F of the continuous laser ray emanating from the laser into at least a first and a second beam F1, F2, which. are separate from each other, and means 17 for directing the said first and second separate beams F1, F2 towards a first article and a second article, respectively.

Preferably, the plant according to the invention may furthermore include means for adjusting the power of the pulsed laser, in order to adjust the position of the pulsed laser ray, the pulse frequency of the pulsed laser ray and the speed of rotation of the glass articles to be cracked off, and means for directing the pulsed laser ray in a plane other than a plane perpendicular to the axis of rotation or of symmetry of the glass article.

In the plant shown, a region of the glass articles to be cracked off is firstly heated by the laser 13, then transferred to the region where the laser 12 acts, and finally treated by the laser 12. Thereafter, the article is transferred to the region where the lasers 11 and 14 act.

The articles, once they have been cracked off, are cooled by one or more air injectors 18. The cooled articles then pass through:

a section 27 for flatting or grinding the rim of the cracked-off glasses;

a washing and bevelling section 28;

a washing and grinding section 29; and a drying section 26.

The plant shown in FIG. 2 is a double-indexing plant, that is to say one which treats two glasses in parallel. The plant could be constructed so as to operate with single indexing, triple indexing, etc.

The heating lasers may have a nominal power of 500 W, or higher. The ray then emanating from this laser is split into several sub-beams having a power of less than 250 W. The pulsed lasers advantageously have a power of the order of 50 W in order to obtain a power density at the point of impact of 1000 W.

The method according to the invention and its plant allow glass tableware of various origins to be treated, namely:
- soda-lime glass, lead crystal, barium glass, etc.,
- hand-blown glass in manual production units;
- glass blown automatically on blow-and-blow or press-and-blow machines;
- pressed glass;
- glasses of various and complex shapes (cylindrical, flared, reentrant, circular, polygonal, etc); etc.

The plant according to the invention makes it possible to vary the rate of production by a few articles per minute to 90 articles per minute, or even more.

The method according to the invention makes it possible to avoid any mechanical contact during the crack-off operation.

What is claimed is:

1. A method for cracking off a glass article (1), rotating about an axis, said method comprising:
    in a first step, subjecting the glass article to the action of a continuous beam of laser rays or to continuous beams of laser rays, so as to define, on the article to be cracked off, a continuous region touched by the laser beam or beams, and
    in a second step, subjecting the region, which was subjected in the first step to the action of one or more continuous beams of laser rays, to the action of at least one focused pulsed laser beam,
    wherein in the first step, the beam or continuous beams of laser rays touch a part or parts of the region with a power density per unit area of less than 30 W/mm$^2$, and
    wherein, in the second step, during approximately one rotation of the article (1) to be cracked off or during at least one rotation of the article (1) to be cracked off, the region which was subjected in the first step to the action of one or more continuous beams of laser rays is subjected to the action of at least one focused pulsed laser beam having a power of less than 250 W so as to form a series of successive points of impact separated from each other, the series defining a substantially continuous line in the part, and the crack-off taking place approximately along the line.

2. The method according to claim 1, whereby the pulsation of the laser beam in the second step and/or the speed of rotation of the article (1) to be cracked off are controlled so that two successive points of impact of the pulsed beam or beams are separated from each other by a distance of less than 2 mm.

3. The method according to claim 1, whereby the pulsation of the pulsed laser beam or beams in the second step and/or the speed of rotation of the article (1) to be cracked off are controlled so that two successive points of impact of the beam or beams on the article (1) to be cracked off are separated from each other by a distance of between 10 $\mu$m and 1 mm.

4. The method according to claim 1, whereby, in the first step, during at least 3 rotations of the article (1) to be cracked off, the region in subjected to the action of a continuous beam of laser rays or to continuous beams of laser rays so that the beams touch the region at one or more parts with a power density per unit area of less than 25 W/mm$^2$.

5. The method according to claim 1, whereby, in the first step, during at least 3 rotations of the article to be cracked off, the region is subjected to the action of a continuous beam of laser rays or to continuous beams of laser rays so that the beams touch the region at one or more parts with a power density per unit area of between 5 W/mm$^2$ and 20 W/mm$^2$.

6. The method according to claim 1, whereby, in the second step, the pulsation of the laser beam is controlled so that the pulse frequency is between 500 and 1500 Hz.

7. Method according to claim 1, whereby, in the first step, a region of from 2 to 8 mm in width is subjected to the action of one or more laser beams.

8. Method according to claim 1, whereby, between the first step and the second step, the region is not subjected to the action of a laser beam during a defined time period.

9. Method according to claim 8, whereby, between the first step and the second step, the region is not subjected to the action of a laser beam during a time period corresponding to at least 5% of the time period during which the region is subjected to the action of a laser beam or beams in the first step.

10. The method according to claim 1, whereby, in the first step, the region is subjected to the action of one or more laser beams during at least first and second time periods which are separate from each other, and whereby the region is not subjected to the action of a laser beam during an intermediate time period between said time periods of treatment by the one or more laser beams.

11. Method according claim 10, whereby the intermediate period corresponds to at least 5% of the first time period during which the region is subjected to the action of a laser beam or beams in the first step.

12. Method according to claim 1, whereby, in the second step, separate parts of the region are simultaneously subjected to the action of a continuous beam of laser rays or to continuous beams of laser rays and to the action of a focused pulsed laser beam respectively, so that each part of the region is touched by the continuous beam of laser rays or the continuous beams of laser rays before being touched by the focused pulsed laser beam.

13. The method according to claim 12, whereby, in the second step, separate parts of the region are simultaneously subjected to the action of a continuous beam of laser rays or to continuous beams of laser rays and to the action of a focused pulsed laser beam respectively, so that each part of the region is touched by the continuous beam of laser rays or the continuous beams of laser rays for at least 0.05 seconds before being touched by the focused laser beam.

14. The method according to claim 1, whereby the focused pulse beam of laser rays touches the region at points with a power density of more than 500 W per point of impact.

15. The method according to claim 1, whereby the region is subjected to the action of a focused pulsed beam of laser rays, and whereby the pulse frequency of the laser beam is adjusted so as to form a series of points of impact in the region of less than 100 $\mu$m in diameter.

16. Method according to claim 1, whereby, in the first step, the article to be cracked off is subjected to the action of at least one collimated continuous beam of laser rays.

17. The method according to claim 2, wherein said distance is less than 1 mm.

18. The method according to claim 3, wherein said distance is between 100 $\mu$m and 800 $\mu$m.

19. The method according to claim 4, wherein the number of said rotations is 5.

20. The method according to claim 6, wherein said pulse frequency is between 800 and 1200 Hz.

21. The method according to claim 13, wherein the number of said seconds is at least 0.1 seconds.

22. The method according to claim 14, wherein said power density is more than 800 W.

23. The method according to claim 15, wherein said diameter is less than 50 μm.

\* \* \* \* \*